June 10, 1941.  K. R. LEWIS  2,245,485
PRESSURE REGULATING DEVICE
Filed April 12, 1938
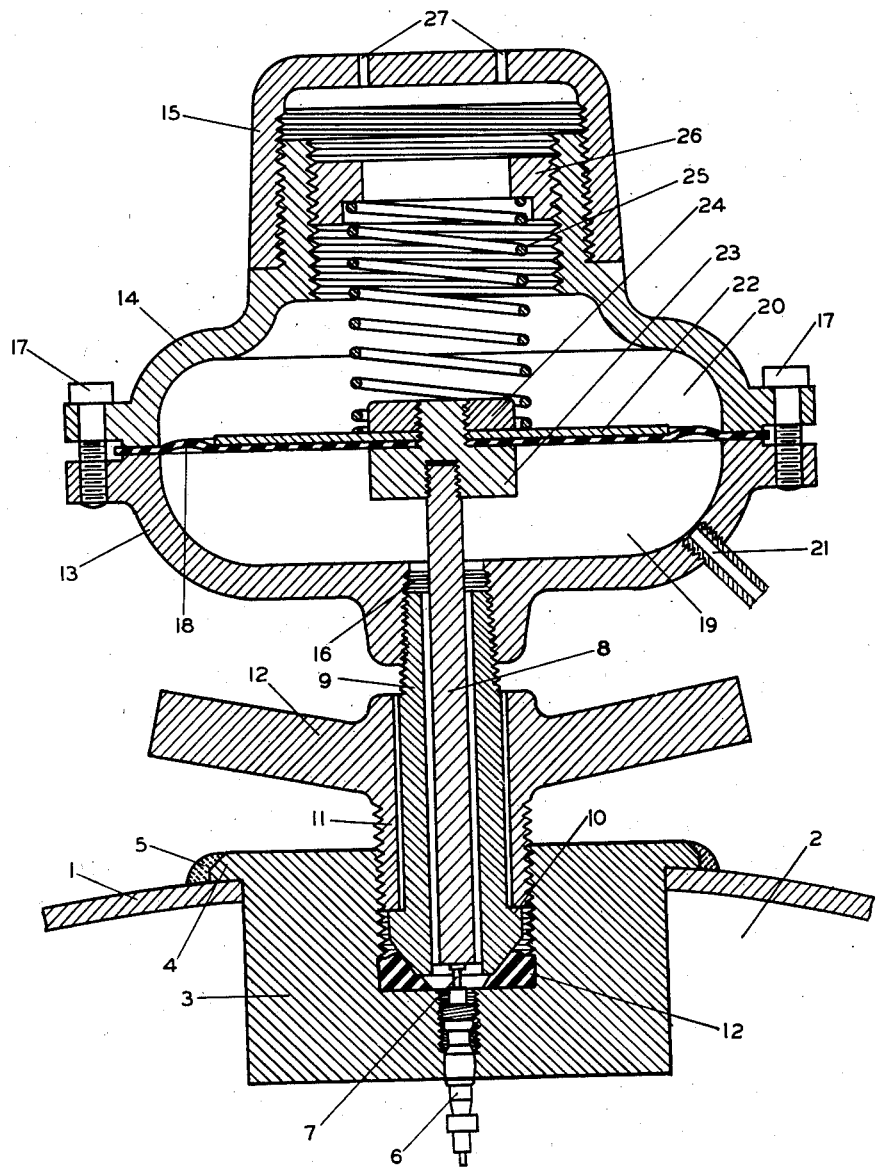
INVENTOR.
K. R. LEWIS
BY
*Hudson, Young, Stanley & Yinger.*
ATTORNEYS Patented June 10, 1941

2,245,485

UNITED STATES PATENT OFFICE 2,245,485

PRESSURE REGULATING DEVICE

Kenneth R. Lewis, Marshalltown, Iowa, assignor to Phillips Petroleum Company, a corporation of Delaware Application April 12, 1938, Serial No. 201,581

2 Claims. (Cl. 221—73.5)

My invention relates to improvements in pressure regulating devices and in its more specific aspect to devices of this general character for use in reducing the pressure of fluids from a high pressure source of supply to any desired pressure for consumption purposes.

Heretofore, in reducing and regulating the pressure of liquefied or high pressure gases, it has been the practice to use conventional types or regulator devices, all of which had high pressure gas in connector fittings between the source of high pressure supply and the regulator valve proper. This resulted in extremely objectionable and oftentimes dangerous high pressure gas leakage at the junctions of the connector fittings. This invention eliminates the necessity for any high pressure joints and hence surmounts the difficulties and dangers experienced in the past.

Also, in the past when a liquefied gas receptacle became exhausted, it was the practice to replace it with a full receptacle, returning the empty one to the bulk plant to be refilled. The usual type regulator remained on the customer's premises and it was periodically necessary to send experienced service men out to check and replace any leaky or defective regulator valves. This procedure obviously meant expensive trips on the part of the service men, especially in cases where the customer's premises were remote from the supply plant base. With the present invention, this costly servicing factor is obviated, for a single valve serves in a dual capacity, namely, as a receptacle valve and as a pressure regulating valve; and, being attached to the receptacle, it is returned with the receptacle to the supply plant whenever the receptacle becomes exhausted. This affords an opportunity to test the valve at the time the receptacle is being refilled.

One important object of this invention is to provide pressure regulating devices in which one valve serves both as the supply reservoir valve and the pressure regulating valve.

Another important object of this invention is to provide pressure regulating devices in which there are high pressure joints between the source of high pressure fluid supply and the regulator proper.

Another important object of this invention is to provide pressure regulating devices which are serviceable and efficient in operation.

A further important object of this invention is to provide pressure regulating devices which are simple and compact in design, rugged in construction and inexpensive to manufacture.

These and other objects and advantages will be apparent from the following description and annexed drawing which represents a vertical cross section view through a preferred embodiment of this invention.

Referring to the drawing:

A portion of a liquefied gas or high pressure gas receptacle, such as a cylinder, is designated by reference numeral 1, while 2 indicates the inside of this receptacle. A valve fitting 3, having a shoulder 4, is fixedly attached to the receptacle at 5 by any conventional method. It is seen that fitting 3 is bored and tapped on several diameters and that a pressure regulating valve 6, which is preferably of the tire valve core type, is contained in the lower tapped portion. Directly above a tire valve core stem 7 there is a fluted plunger 8. While this plunger is preferably fluted, it is apparent that it may be of any one of a variety of shapes. Concentric with plunger 8 is a connector conduit 9 which has a shoulder 10 near its lower end and is externally threaded at its upper end. Concentric with both the plunger 8 and conduit 9 is a connector sleeve 11, the lower portion of which is externally threaded and engages in the upper tapped portion of fitting 3. A handle 12, integral with the connector sleeve, permits of the ready installation of this connector. Through the cooperation of the connector sleeve and shoulder 10, conduit 9 is firmly located on a resilient gasket 12'.

A regulator housing, consisting of a base 13, a top 14 and a cover 15, communicates with conduit 9 through a gas inlet 16. The base and top are connected by bolts 17. The interior of the housing constitutes a chamber which is divided by a flexible diaphragm 18 into two compartments, namely, a service compartment 19 and an adjustment compartment 20. A gas outlet or utilization conduit is shown at 21 connected to the service compartment. Above diaphragm 18 is a back-up plate 22 which is held against the diaphragm by a bolt 23 and a nut 24. The head of bolt 23 is tapped and plunger 8 is mounted therein. The diaphragm is thrust downwardly due to pressure exerted on back-up plate 22 by a compression spring 25 which is contained in the adjustment compartment. The pressure exerted by this spring on the diaphragm is adjustable through the action of an externally threaded adjusting nut 26, which nut is in engagement with housing top 14. Access to the adjustment compartment and the adjusting nut is rendered expeditious by simply removing cover 15. The adjustment compartment is maintained at atmospheric pressure by virtue of its communicating with the outside through openings 27 in the cover.

In the operation of this invention, the compression spring 25 in the adjustment compartment 20 is adjusted so as to exert any desired pressure on the diaphragm 18. The resulting downward thrust of the diaphragm is transmitted through bolt 23, plunger 8 and valve stem 7 to tire valve core 6 actuating the same.

High pressure gas receptacle 1 passes upwardly through the tire valve core and, in so passing its pressure is reduced to a predetermined pressure for consumption purposes. The course of gas movement on leaving the tire valve core is through the space between the plunger and conduit 9, into service compartment 19 and thence out of the service compartment by way of gas outlet 21.

Should the pressure of the gas entering the service compartment become excessive, the diaphragm and coacting plunger 8 are moved in an upward direction against the action of the compression spring. Sufficient upward movement of the diaphragm and plunger will allow the valve stem to move upward to a position where it will shut off further passage of gas through the tire valve core. The valve will then remain closed until the pressure in the service compartment falls below the pressure exerted by the compression spring, at which time the diaphragm will again be moved downwardly and valve stem 7 will be gradually pushed into the tire valve core, re-actuating the same and permitting more gas to be introduced into the service compartment.

While this invention is primarily intended for use in connection with the regulation of gas pressures, it is obvious that it is also adaptable to regulate the flow of liquids.

It is to be understood that the form of my invention, herewith shown and described, is to be taken as a preferred example of the same, and that various changes in shape, size, and arrangement of parts may be resorted to without departing from the spirit of my invention as defined by the appended claims.

I claim:

1. In a fuel gas system in which the gas is stored as a liquid under high pressure in containers and in which there is a gas utilization conduit on each customer's premises supplying gas to the gas consuming appliances at a low pressure, the combination comprising a container for the gas, a valve fitting in the container, the valve fitting having a passage communicating with the interior of the container, a valve closing the passage and having an operating member accessible from the exterior of the container, a gas utilization conduit, a connector on the utilization conduit, the connector having a passage for placing the valve fitting and the service line in communication, a gas pressure actuated means in communication with the passage, a force transmitting element in the connector passage for acting between the gas pressure actuated means and the container valve operating member, and means for connecting the valve fitting and the connector, the force transmitting means being so designed that with such connection the container valve is operated to maintain a substantially constant low pressure in the utilization conduit.

2. In a fuel gas system in which the gas is stored as a liquid under high pressure in containers and in which there is a gas utilization conduit on each customer's premises supplying gas to the gas consuming appliances at a low pressure, the combination comprising a container for the gas, a valve fitting in the container, a valve in the valve fitting closing the container, an operating member on the valve, the valve and operating member being located entirely within the outer extremities of the valve fitting, a gas utilization conduit, a connector on the utilization conduit, a force transmitting element movably retained in the connector, a gas pressure actuated means in communication with the connector, and means acting between the valve fitting and the connector to make a sealed connection between the two, the force transmitting element being so dimensioned that with such connection movement of the gas pressure actuated means due to pressure changes in the connector is transmitted to the valve operating member to maintain a substantially constant low pressure in the connector as gas is withdrawn through the utilization line.

KENNETH R. LEWIS.

CERTIFICATE OF CORRECTION

Patent No. 2,245,485.   June 10, 1941.

KENNETH R. LEWIS.

It is hereby certified that error appears in the printed specification of the above numbered patent requiring correction as follows: Page 1, first column, line 10, for the word "or" before "regulator" read --of--; line 46, after "are" insert --no--; and second column, line 45, for "holt" read --bolt--; page 2, first column, line 12, after "gas" insert --in--; and that the said Letters Patent should be read with this correction therein that the same may conform to the record of the case in the Patent Office.

Signed and sealed this 26th day of August, A. D. 1941.

(Seal)

Henry Van Arsdale,
Acting Commissioner of Patents.